Aug. 7, 1956     D. E. BURGER     2,757,763
AUTOMATIC EMERGENCY BRAKE MECHANISM
Filed Oct. 11, 1951     2 Sheets-Sheet 1

INVENTOR.
Donald Edgar Burger

Aug. 7, 1956  D. E. BURGER  2,757,763
AUTOMATIC EMERGENCY BRAKE MECHANISM
Filed Oct. 11, 1951  2 Sheets-Sheet 2

INVENTOR.
Donald Edgar Burger

United States Patent Office 2,757,763
Patented Aug. 7, 1956

2,757,763

AUTOMATIC EMERGENCY BRAKE MECHANISM

Donald Edgar Burger, Denver, Colo.

Application October 11, 1951, Serial No. 250,934

2 Claims. (Cl. 188—152)

This invention relates to braking mechanism and more particularly to the means for automatically applying brakes in the event of failure of a braking system operable by differential fluid pressures.

One of the objects of my invention is to provide improved auxiliary means for association with a differential fluid pressure brake actuation system which will insure automatic application of the brakes in event of total or partial failure of the said fluid brake actuation system.

Another object is to produce improved spring actuated means for auxiliary operation of brakes which are normally actuated by differential fluid pressure control means and which will become automatically operative in event of failure of the said fluid pressure control means.

Still a further object is to produce a spring operated unit for the emergency application of brakes which can be easily mounted in association with a motor of differential fluid pressure operated brake systems having an emergency brake line and so connect the unit into the said emergency brake line of the fluid pressure system that differential pressure can be effective to cause the spring operated unit to be inoperative when the brake system is operating in a normal manner.

Other objects will become apparent from the following description taken in connection with the accompanying drawings illustrating an ambodiment of the invention.

The achievement of the above objects and advantages are made possible in the construction of the brake chamber disclosed in the accompanying drawings.

Figure 1:
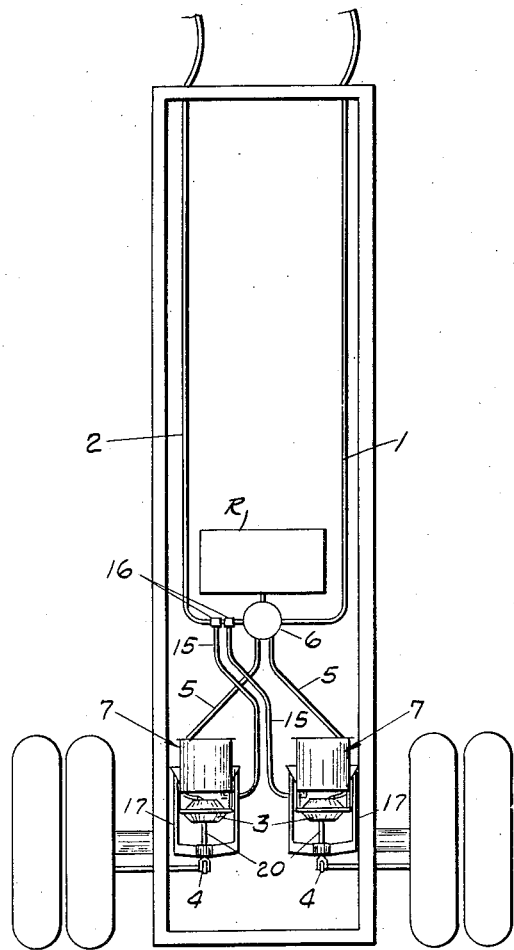
Figure 1 is a schematic view of a trailer brake system having embodied therein my novel brake chamber for brake application.

Referring to Figure 1, the trailer brake system in which my novel brake chamber is employed receives pressure fluid from a compressor that is mounted on the tractor unit, which is not shown, to the reservoir R through conduits 1 and 2. Conduit 1 is the usual brake line and fluid under pressure supplied therethrough is controlled by the usual manual valve on the tractor whereby the brakes are applied and released at will. Conduit 2 is the so-called emergency brake line and is continuously supplied with fluid under pressure by the tractor compressor.

The existing trailer air chambers 3 for actuating the brake levers 4 receive pressure fluid through conduits 5 which are connected through the usual trailer control valve 6 to the reservoir R.

The trailer vehicle has mounted thereon my improved brake mechanism for automatic emergency application including the two units 7. Each of these units is shown in detail in Figures 2 to 4 and comprises a pressure plate 8 and necessary springs 9 for automatically applying the trailer brakes when there is a partial or full loss of pressure fluid for any reason. It should be understood that all the springs 9 when fully extended exert sufficient pressure for brake application.

Figure 4:
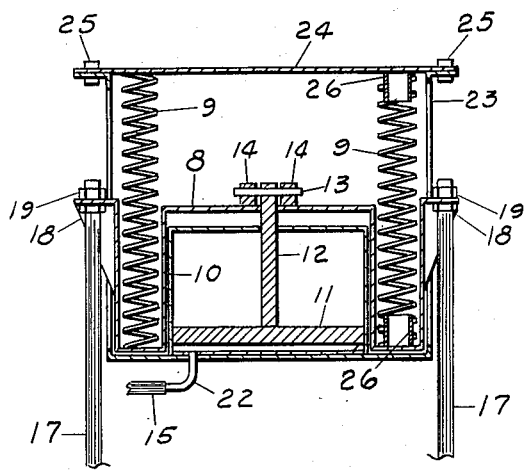
Figure 4 is a sectional view taken along line 4—4 of Figure 3.
Figure 5:
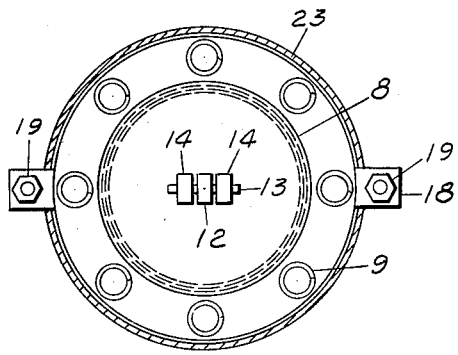
Figure 5 is a sectional view taken along line 5—5 of Figure 2.

The inner pressure chamber, shown best in Figure 4, comprises a cylinder 10, piston 11 and piston rod 12, which is connected to the pressure plate 8 by a clevis pin 13 through the piston rod 12 and brackets 14 mounted on the pressure plate 8. Between the piston 11 and cylinder 10 will be provided any well known sealing means.

The piston 11 is actuated by existing pressure fluid through conduit 15 which is connected to open T's 16 shown in Figure 1. As the piston 11 is forced back by existing pressure, the pressure plate 8 is also forced back thereby compressing the springs 9, which in turn releases pressure on push rods 17 which are connected to the pressure plate 8 by brackets 18. This places the unit 7 in released or inoperative condition, which is normal condition as long as there is no power failure.

The push rods 17 are threaded and equipped with adjustable nuts 19 to adjust the length of the stroke. The push rods 17 are connected to the air pressure chamber push rod 20, shown in Figure 1 by a slide eye 21 which permits brake actuation in a normal manner by operation of the air chamber 3 when the units 7 are inoperative.

The conduit 15 is preferably connected to the pressure chamber of unit 7 by an orifice elbow 22 in order to control the rate of exhaust of fluid pressure in the pressure chamber and thereby prevent too sudden application of the brakes when there is a failure in the pressure fluid system.

The housing 23 is provided with slotted openings on opposite sides to permit the travel of the pressure plate brackets 18 which are connected to the pressure plate 8. The slots also act as guides. The housing cover 24 is fastened to the housing flange by means of bolts 25. Bosses 26 are provided on the housing cover 24 and on the top of pressure plate 8 to hold the springs 9 in correct position. Mounting brackets 27 are provided to mount the units 7 onto the existing air chamber 3.

Figure 2:
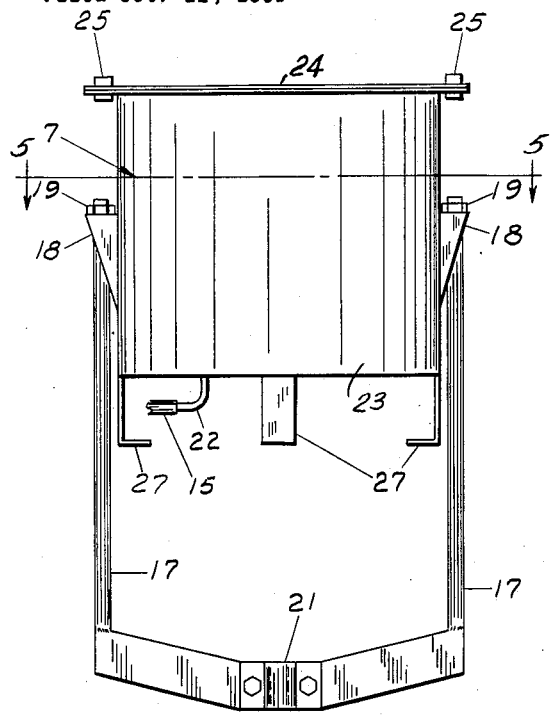
Figure 2 is an enlarged plan view of the brake chamber.
Figure 3:
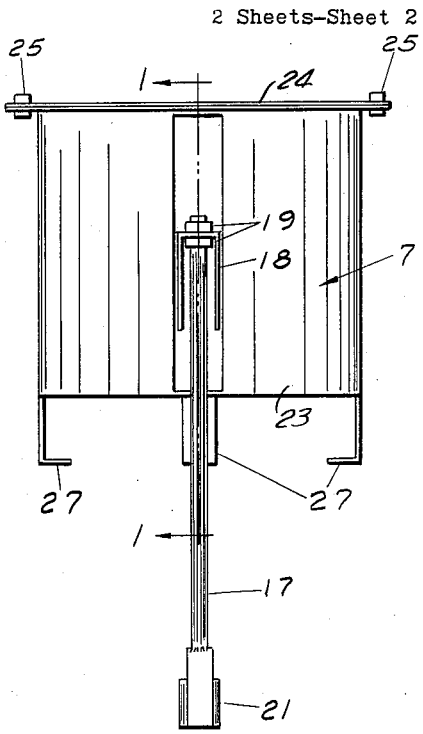
Figure 3 is a side view of the brake chamber.

From the foregoing explanation of the construction of the units 7 and the manner in which they are connected to the emergency brake line 2 and the usual trailer brake chamber 3, it is believed to be obvious that when there is a partial or complete loss of pressure fluid in the pressure fluid brake system and also effective in conduit 2, then the pressure in the pressure chamber of each unit 7 will be affected thereby, allowing the compressed springs 9 to force the pressure plate 8 and the push rods 17, which are connected to the pressure plate 8, to their positions shown in Figures 2 and 4. The push rods 17, being connected to the existing air chamber push rods 20 by a slide eye 21, force the brake lever 4 back, thereby applying the brakes. When the pressure fluid in the brake system is built back to normal operating pressure, the fluid pressure from conduit 2 will enter the pressure chamber of each unit 7 through conduit 15 and orifice elbow 22, thereby forcing the piston 11 and piston rod 12 in a direction compressing springs 9 which releases the pressure on the push rods 17. The unit 7 will then be in retracted position allowing normal operation of the existing brake chamber 3.

It is to be understood that the above described embodiment of my invention is for the purpose of illustration only and various changes may be made therein without departing from the spirit and scope of the invention.

What I claim is:

1. An emergency brake unit for mounting on an existing brake chamber means and for connection with its actuating rod and being controllable by fluid pressure, said unit comprising a casing structure carrying means for mounting it on the brake chamber means, piston and cylinder means in the casing structure, spring means in the casing structure caused to be tensioned to store up energy by operation of the piston under the action of fluid pressure, rods positioned on diametrically opposite sides of the casing structure and connected to be movable with the piston, said rods being arranged to extend past the exterior of the brake chamber means to the actuating rod side thereof when the unit is mounted on the chamber means, and means connecting the rods to the actuating rod so that the actuating rod can be actuated by the spring means and the brakes applied when the fluid pressure acting on the piston is insufficient to act on, tension and store energy in the spring means, said connecting means being such that it and the actuating rod will be capable of relative movement to permit free movement of the actuating rod for brake operation when the spring means is tensioned by movement of the piston under the action of fluid pressure.

2. An emergency brake unit for mounting on a brake chamber means and for connection with its actuating rod and controllable by fluid pressure, said unit comprising a cylindrical casing structure having means for mounting it on the rear of the brake chamber means, piston and cylinder means in the casing structure, a plurality of compression springs in the casing structure and so mounted as to be compressed by operation of the piston under the action of fluid pressure, rods positioned on diametrically opposite sides of the casing structure and connected to be movable with the piston, said rods being arranged to extend past the exterior of the brake chamber means to the actuating rod side thereof when the unit is mounted on the chamber means, and means connecting the rods to the piston rod so that the actuating rod can be actuated by the springs and the brakes applied when the fluid pressure acting on the piston is insufficient to compress the springs, said connecting means having a slidable eye surrounding the actuating rod and engageable with the end thereof to apply the brakes when the spring moves the piston toward retracted position.

References Cited in the file of this patent

UNITED STATES PATENTS

| | | |
|---|---|---|
| 1,156,869 | Walker | Oct. 12, 1915 |
| 1,528,966 | Berger | Mar. 10, 1925 |
| 1,548,394 | Summer | Aug. 4, 1925 |
| 1,997,807 | Bird | Apr. 16, 1935 |
| 2,282,615 | Spalding | May 12, 1942 |
| 2,409,908 | Simpkins | Oct. 22, 1946 |

FOREIGN PATENTS

| | | |
|---|---|---|
| 550,412 | Germany | Apr. 21, 1932 |